(No Model.) 2 Sheets—Sheet 1.

E. GALLAGHER.
HAY PRESS.

No. 351,104. Patented Oct. 19, 1886.

Witnesses:

Inventor
E. Gallagher
By Dewey & Co.
Attys

N. PETERS, Photo-Lithographer, Washington, D. C.

(No Model.) 2 Sheets—Sheet 2.

E. GALLAGHER.
HAY PRESS.

No. 351,104. Patented Oct. 19, 1886.

Witnesses,

Inventor,
E. Gallagher
By Dewey & Co.
attys

UNITED STATES PATENT OFFICE.

EUGENE GALLAGHER, OF BODIE, CALIFORNIA, ASSIGNOR OF ONE-HALF TO MORTEN ANDERSON, OF SAME PLACE.

HAY-PRESS.

SPECIFICATION forming part of Letters Patent No. 351,104, dated October 19, 1886.

Application filed July 14, 1886. Serial No. 208,033. (No model.)

*To all whom it may concern:*

Be it known that I, EUGENE GALLAGHER, of Bodie, Mono county, State of California, have invented an Improvement in Hay-Presses; and I hereby declare the following to be a full, clear, and exact description of the same.

My invention relates to that class of baling-presses in which a reciprocating follower works within a single double-ended chamber, whereby a bale is pressed upon each stroke of the follower, the feeding for one bale taking place during the completion of the other.

My invention consists in the chamber having a discharge at each end and the reciprocating follower in said chamber, the novel means for operating the follower, the arrangement of feed and discharge doors and their fastenings, the means for automatically passing the ties around the bale and releasing them, and the various details of construction, all of which I shall hereinafter fully describe.

The object of my invention is to provide a simple and effective press, capable of great work with the least expenditure of time and power.

Figure 1:
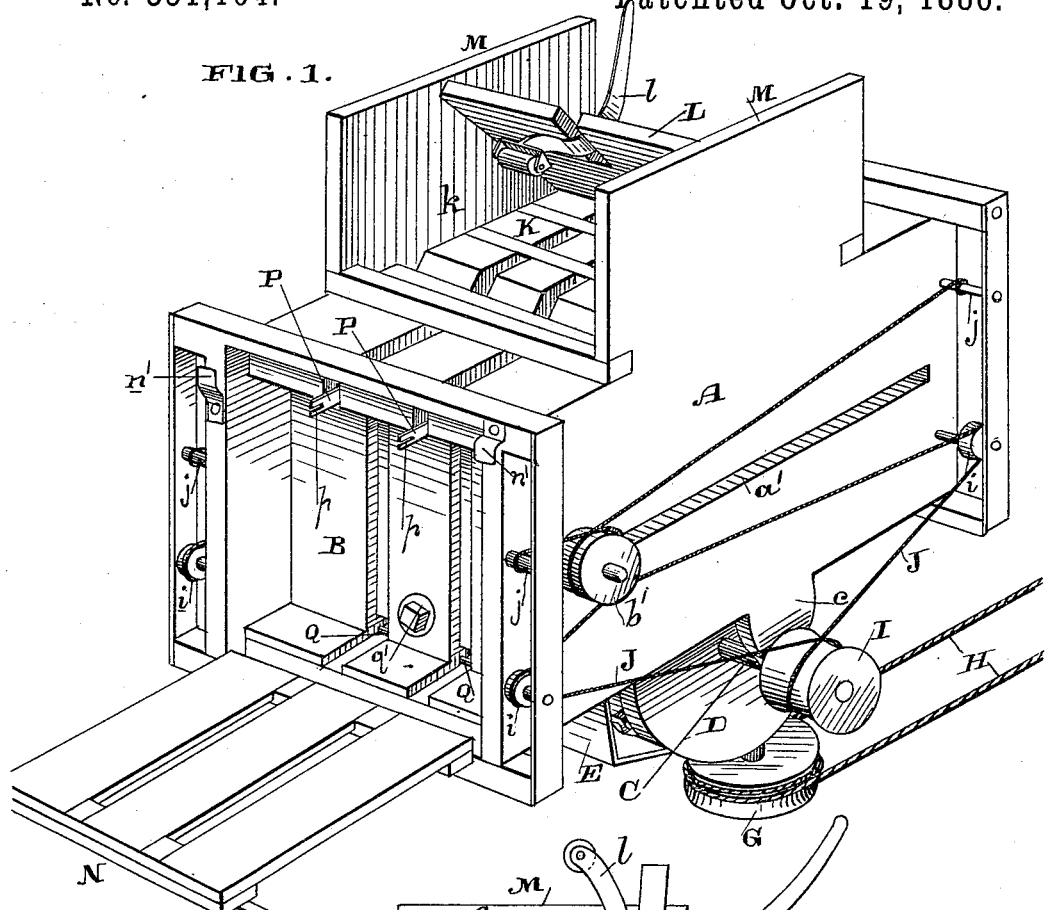
Figure 2:
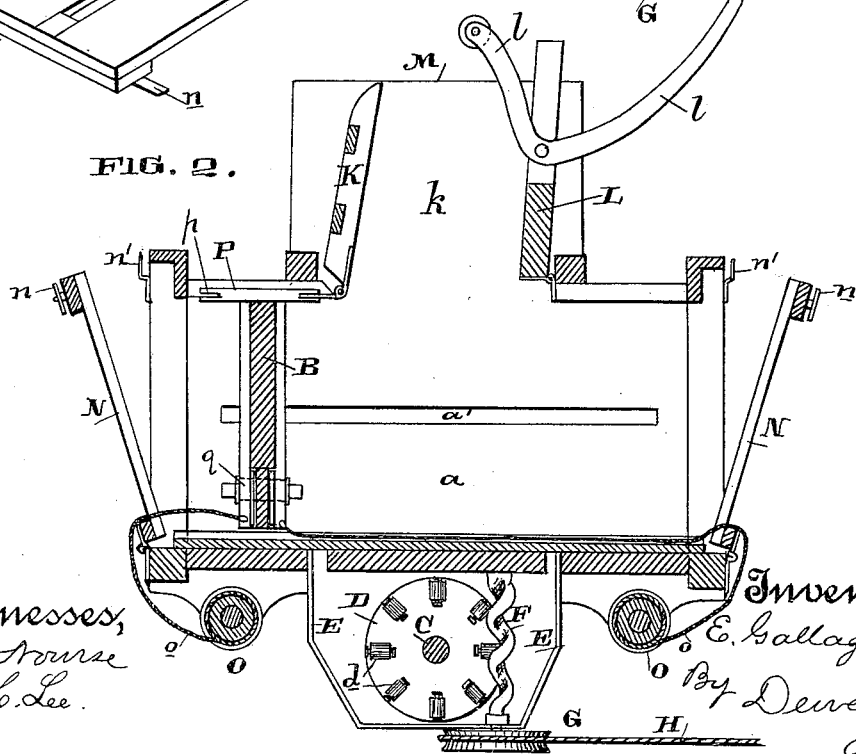
Figure 3:
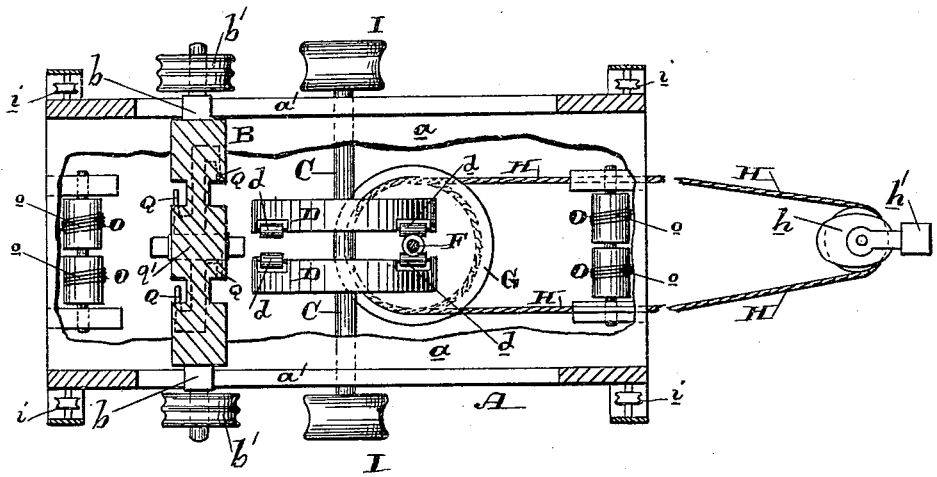
Figure 4:
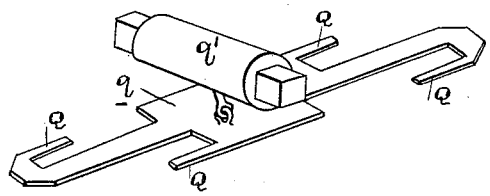

Referring to the accompanying drawings for a more complete explanation of my invention, Figure 1 is a perspective view of my press. Fig. 2 is a vertical longitudinal section of same. Fig. 3 is a bottom view, a portion of the floor being broken. Fig. 4 is a view of the pins Q on the plate $q$, and of the shaft $q'$.

A is the main frame of the press, in which is formed the baling-chamber $a$, having a grooved bottom. The frame is to be set upon wheels, so that it may readily be moved about.

B is the follower, seated in the baling-chamber $a$ and adapted to move back and forth therein, said follower having arms $b$, projecting from each end through elongated slots $a'$, made in the sides of the chamber, whereby it is guided and receives the attachment of the proper operating mechanism.

The follower is reciprocated by the following means: Under the main frame is a transverse shaft, C, which is journaled in bearings $c$, secured to the frame. Upon the center of the shaft C are rigidly secured the worm-wheels D, which consist of two independent wheels, separated by a small space and having rollers $d$ mounted oppositely in their adjacent faces, said rollers being arranged radially, as shown. E is a bracket, secured under the frame A. In this bracket is mounted a vertical worm-shaft, F, which passes up in the space between the two worm-wheels D and engages their rollers $d$, the upper end of the worm-shaft being pivoted in the bottom of the main frame. On the lower end of the worm-shaft is rigidly secured the driving-drum G, which receives the endless operating rope or cable H, which extends to a block, $h$, secured to a post or stake, $h'$, driven in the ground at the distance which the horses have to travel. On each end of the shaft C is secured a drum, I, and on the projecting arms $b$ of the follower are fitted double-faced pulleys $b'$.

In brackets at the ends of the main frame are mounted the guide-pulleys $i$.

J are ropes, chains, or cables which wind on the drums I, pass around the guide-pulleys $i$, and around the pulleys $b'$ on the arms of the follower, their ends being secured to fixed bolts or bearings $j$ at each end of the frame A.

The operation is as follows: The horses are hitched to the rope H, and are walked out toward the stake $h'$. The drum G is thus rotated, whereby the worm-shaft F effects the rotation of the worm-wheels D, and they in turn operate the drums I, which wind or unwind the cables J, thereby forcing the follower in one or the other direction. When the horses have reached their limit of travel, they are turned around, and, instead of having no work on their return, as is the case with single-acting presses, they reverse the operating mechanism and cause the follower to make its return-stroke, which presses a second bale, as I shall now describe. In the top of the main frame A is made a feed-opening, $k$, which is controlled by a hinged, slatted, or grated door, K, which is held down by means of a bent lever, $l$, pivoted in a hinged plate, L, lying opposite and above the door. The plate L is slotted, and the bent lever works through it, its end bearing against the back or hinged end of the door. The door K, the plate L, and two side plates, M, fixed in position, provide a feed-chamber by which the hay is properly directed into the baling-chamber. The ends of the main frame are provided with doors N, which are hinged along their lower edges, and have pivoted to their tops the securing-latch bars $n$, the ends of which engage the oppositely-arranged cleats $n'$. When the follower is full back, the hay is fed in through the top door until the required amount lies in the baling-chamber $a$. The top door is then closed down and fastened by the bent lever $l$. The end doors are closed and fastened and the horses started up, so as to force the follower over and to compress the hay into a bale. After the follower has passed the top opening the door K may be opened, and while the operators are completing the bale just formed more hay is fed into the chamber and is ready by the time the first bale is discharged. The top door is again closed, and the horses are driven in an opposite direction, thus returning the follower and pressing the bale in the first end of the chamber. In this way the follower is made to press two bales, one on its forward stroke and the second on its return-stroke, so that no time is wasted. The bales are discharged through the end doors.

Upon reels O, under the main frame, is the rope or wire $o$, with which the bales are tied. Secured upon the top of the follower are arms P, which extend on each side of the follower, and are of sufficient length to project through the slatted or grated end doors of the press when the follower is driven home. The ends of these arms have small notches $p$ for the engagement of the tying-rope. The faces of the follower are made with vertical grooves, into which, at their bases, and on each side of the follower, the pins Q are adapted to project. These pins are formed upon a plate, $q$, mounted and adapted to slide in the bottom of the follower, this movement being given it by means of the shaft $q'$, journaled in the follower and connected with the plate, as shown. The shaft $q'$ is adapted to receive a wrench or key on each end, whereby it can be rocked so as to impart movement to the plate $q$, so that its pins Q are projected and withdrawn.

The arrangement of the pins on the plate is such that when those upon one side of the follower are projected those upon the other are withdrawn, this arrangement being made simply by making the pins project from opposite directions.

The automatic placing of the tying ropes or wires is as follows: The ends of the ropes from the set of reels at one end of the frame are first passed through the grated end doors into the grooves in the bottom of the baling-chamber, and are connected with the projecting pins Q on that side of the follower. When the follower moves over to the other end of the chamber, it carries the ropes with it, thus spreading them along the whole length of the chamber $a$ in the bottom grooves. When they have reached the other end, the pins Q, upon which they were engaged, are withdrawn by operating the shaft $q'$ with a key, which movement releases the ropes and at the same time projects the opposite pins, so that the ends of the ropes from that end of the press may be attached thereto. The first set of ropes being now free their ends are pulled up and let into the notches on the ends of the arms P, and, now, when the follower is moved back, the ropes are carried over the bale, and, by reason of the arms projecting through the grated door, the ends of the ropes are easily reached and tied. In projecting the first pins, Q, for the attachment of the ropes again the opposite pins are released, so that the ropes which were attached to them are relieved, and may be placed in the notched arms on that side.

Having thus described my invention, what I claim as new, and desire to secure by Letters Patent, is—

1. In a hay-press, the baling-chamber $a$, having door-controlled discharge-openings in each end, and a door-controlled feed-opening in its top, and the follower B, mounted within the chamber and having arms $b$, projecting through slots in the sides thereof, in combination with the means for reciprocating the follower, consisting of the endless rope H, to which the horses are hitched, the reversible drum G, on which the rope is secured, the drums I, guide pulleys $i$, pulleys $b'$ on the follower, and chains, ropes, or cables J, operated thereby, and a power-connection between the drum G and the drums I, substantially as herein described.

2. In a hay-press, the baling-chamber $a$, having door-controlled discharge-openings in each end, and a door-controlled feed-opening in its top, and the follower B, mounted within the chamber and having arms $b$, projecting through slots in the sides thereof, in combination with the means for reciprocating the follower, consisting of the transverse shaft C under the press, having the drums I, and the two-part worm-wheel D, with its rollers $d$, the worm-shaft F, and the drum G on said shaft, the endless rope H, by which the drum is operated, and the chains, ropes, or cables J upon the drum I, and operating over pulleys $i$ and $b'$, for moving the follower, all arranged and adapted to operate substantially as herein described.

3. In a hay-press, the baling-chamber $a$, having the discharge-doors at each end, and a reciprocating follower, B, in combination with the feed-door K in the top of the chamber, and the means for securing it, consisting of the hinged plate L, and the bent lever $l$, pivoted in said plate and bearing on the door, substantially as herein described.

4. In a hay-press, the baling-chamber $a$, having the discharge-doors at each end, and the reciprocating follower B within said chamber, in combination with the hinged feed-door K in the top of the chamber, the opposing hinged plate L, having the pivoted bent lever $l$, by which the door is secured, and the fixed side plates, M, whereby a feed-chamber is formed, communicating with the baling-chamber, substantially as herein described.

5. In a hay-press, the reciprocating follower B within the baling-chamber, in combination with the means for automatically placing the ropes or wires for tying, consisting of the oppositely-adjustable pins Q on the lower edges of the faces of the follower, and the arms P, secured to and projecting on each side of the top of the follower, substantially as herein described.

6. In a hay-press, the frame A, having the chamber $a$, the rope or wire carrying reels O under the frame, and the reciprocating grooved follower B within the chamber, in combination with the means for placing the tying ropes or wires in position, consisting of the longitudinally-moving plate $q$ in the base of the follower, the shaft $q'$, connected therewith, and by which it is operated, and the oppositely-arranged pins Q upon the plate, adapted to be projected into and withdrawn from the grooves of the follower, so that the ends of the tying rope or wire may be secured thereto, and the notched arms P on the top of the follower and projecting on each side thereof, substantially as herein described.

In witness whereof I have hereunto set my hand.

EUGENE GALLAGHER.

Witnesses:
RICHARD M. FRAY,
A. C. RAYMOND.